United States Patent
Grudzien

(10) Patent No.: US 7,141,447 B2
(45) Date of Patent: Nov. 28, 2006

(54) METHOD OF FORMING A SEAL BETWEEN A HOUSING AND A DIAPHRAGM OF A CAPACITANCE SENSOR

(75) Inventor: Chris P. Grudzien, Haverhill, MA (US)

(73) Assignee: MKS Instruments, Inc., Wilmington, MA (US)

(*) Notice: Subject to any disclaimer, the term of this patent is extended or adjusted under 35 U.S.C. 154(b) by 0 days.

(21) Appl. No.: 10/960,158

(22) Filed: Oct. 7, 2004

(65) Prior Publication Data

US 2006/0079016 A1   Apr. 13, 2006

(51) Int. Cl.
*H01L 21/00* (2006.01)

(52) U.S. Cl. ............................................ 438/51; 438/53

(58) Field of Classification Search ............ 438/48–53, 438/106–127; 73/706, 718, 724; 361/282.1–283; 257/414–417
See application file for complete search history.

(56) References Cited

U.S. PATENT DOCUMENTS

| | | | |
|---|---|---|---|
| 2,416,557 A | 2/1947 | Wiener | |
| 2,751,530 A | 6/1956 | Armstrong | |
| 2,753,515 A | 7/1956 | Rickner | |
| 2,755,419 A | 7/1956 | Hollmann | |
| 2,800,796 A | 7/1957 | Westcott et al. | |
| 2,907,320 A | 10/1959 | Weese et al. | |
| 2,999,386 A | 9/1961 | Wolfe | |
| 3,000,215 A | 9/1961 | Atanasoff et al. | |
| 3,113,459 A | 12/1963 | Slater | |
| 3,153,847 A | 10/1964 | Lindberg | |
| 3,243,998 A | 4/1966 | Vosteen | |
| 3,318,153 A | 5/1967 | Lode | |
| 3,354,721 A | 11/1967 | Fiske | |
| 3,371,537 A | 3/1968 | Kiene | |
| 3,460,310 A | 8/1969 | Adcock et al. | |
| 3,619,742 A | 11/1971 | Rud, Jr. | |
| 3,620,083 A | 11/1971 | Dimeff et al. | |
| 3,675,072 A | 7/1972 | Hahn et al. | |
| 3,858,097 A | 12/1974 | Polye | |

(Continued)

FOREIGN PATENT DOCUMENTS

DE   1 282 302   11/1968

(Continued)

OTHER PUBLICATIONS

U.S. Appl. No 2002/026835, filed Mar. 7, 2002, Jacob et al.

(Continued)

*Primary Examiner*—Savitri Mulpuri
(74) *Attorney, Agent, or Firm*—Wilmer Cutler Pickering Hale and Dorr LLP

(57) ABSTRACT

The axial distance between opposing conductors of a capacitance pressure transducer can depend, in part, upon the thickness of a seal that is disposed between a housing and a diaphragm of the capacitance pressure transducer. The present invention utilizes spacer elements and sealing beads to form a seal that is disposed between the housing and the diaphragm of a capacitance pressure transducer. The sealing beads have a melting temperature that is lower than the melting temperature of the spacer elements. The sealing beads are melted so that they flow around and surround the unmelted spacer elements. Upon solidifying, the sealing beads and the spacer elements thus form the seal. The thickness of the seal can be established accurately and uniformly by controlling the height of the spacer elements. By utilizing a seal that has an accurate and uniform thickness, the opposing conductors of the capacitance pressure transducer can be accurately positioned and oriented in relationship to each other during the manufacturing process.

17 Claims, 8 Drawing Sheets

U.S. PATENT DOCUMENTS

| | | |
|---|---|---|
| 3,952,234 A | 4/1976 | Birchall |
| 3,968,695 A | 7/1976 | Weiss et al. |
| 4,008,619 A | 2/1977 | Alcaide et al. |
| 4,011,901 A | 3/1977 | Flemings et al. |
| 4,020,674 A | 5/1977 | Fechter et al. |
| 4,084,438 A | 4/1978 | Lee et al. |
| 4,084,439 A | 4/1978 | Teter et al. |
| 4,120,206 A | 10/1978 | Rud, Jr. |
| 4,136,603 A | 1/1979 | Doyle, Jr. |
| 4,141,252 A | 2/1979 | Lodge |
| 4,168,517 A | 9/1979 | Lee |
| 4,168,518 A | 9/1979 | Lee |
| 4,176,557 A | 12/1979 | Johnston |
| 4,178,621 A | 12/1979 | Simonelic et al. |
| 4,227,419 A | 10/1980 | Park et al. |
| 4,229,776 A | 10/1980 | Antikainen et al. |
| 4,302,063 A | 11/1981 | Rudy |
| 4,322,775 A | 3/1982 | Delatorre |
| 4,334,725 A | 6/1982 | Teshima et al. |
| 4,357,834 A | 11/1982 | Kimura |
| 4,358,814 A | 11/1982 | Lee et al. |
| 4,381,492 A | 4/1983 | Steingroever et al. |
| 4,389,895 A | 6/1983 | Rud, Jr. |
| 4,422,125 A | 12/1983 | Antonazzi et al. |
| 4,422,335 A | 12/1983 | Ohnesorge et al. |
| 4,424,713 A | 1/1984 | Kroninger, Jr. et al. |
| 4,425,799 A | 1/1984 | Park |
| 4,426,673 A | 1/1984 | Bell et al. |
| 4,433,580 A | 2/1984 | Tward |
| 4,434,203 A | 2/1984 | Briefer |
| 4,458,537 A | 7/1984 | Bell et al. |
| 4,464,725 A | 8/1984 | Briefer |
| 4,495,820 A | 1/1985 | Shimada et al. |
| 4,499,773 A | 2/1985 | Crampton et al. |
| 4,542,436 A | 9/1985 | Carusillo |
| 4,562,742 A | 1/1986 | Bell |
| 4,567,773 A | 2/1986 | Cooper et al. |
| 4,572,204 A | 2/1986 | Stephens |
| 4,587,851 A | 5/1986 | Mortberg |
| 4,598,381 A | 7/1986 | Cucci |
| 4,603,371 A | 7/1986 | Frick |
| 4,617,607 A | 10/1986 | Park et al. |
| 4,628,403 A | 12/1986 | Kuisma |
| 4,670,733 A | 6/1987 | Bell |
| 4,679,643 A | 7/1987 | Bove |
| 4,691,574 A | 9/1987 | Delatorre |
| 4,714,464 A | 12/1987 | Newton |
| 4,730,496 A | 3/1988 | Knecht et al. |
| 4,733,875 A | 3/1988 | Azuma et al. |
| 4,735,090 A | 4/1988 | Jeffrey et al. |
| 4,735,098 A | 4/1988 | Kavli et al. |
| 4,738,276 A | 4/1988 | Adams |
| 4,748,861 A | 6/1988 | Matsumoto et al. |
| 4,765,188 A | 8/1988 | Krechmery et al. |
| 4,769,738 A | 9/1988 | Nakamura et al. |
| 4,774,626 A | 9/1988 | Charboneau et al. |
| 4,785,669 A | 11/1988 | Benson et al. |
| 4,807,477 A | 2/1989 | Myers et al. |
| 4,815,324 A | 3/1989 | Tada et al. |
| 4,823,603 A | 4/1989 | Ferran et al. |
| 4,850,227 A | 7/1989 | Luettgen et al. |
| 4,851,015 A | 7/1989 | Wagner et al. |
| 4,864,463 A | 9/1989 | Shkedi et al. |
| 4,875,368 A | 10/1989 | Delatorre |
| 4,898,035 A | 2/1990 | Yajima et al. |
| 4,920,805 A | 5/1990 | Yajima et al. |
| 4,935,841 A | 6/1990 | Jonsson et al. |
| 4,944,187 A | 7/1990 | Frick et al. |
| 4,977,480 A | 12/1990 | Nishihara |
| 5,001,595 A | 3/1991 | Dittrich et al. |
| 5,005,421 A | 4/1991 | Hegner et al. |
| 5,020,377 A | 6/1991 | Park |
| 5,050,034 A | 9/1991 | Hegner et al. |
| 5,134,887 A | 8/1992 | Bell |
| 5,150,275 A | 9/1992 | Lee et al. |
| 5,155,653 A | 10/1992 | Kremidas |
| 5,165,281 A | 11/1992 | Bell |
| 5,186,055 A | 2/1993 | Kovacich et al. |
| 5,188,780 A | 2/1993 | Lange et al. |
| 5,189,591 A | 2/1993 | Bernot |
| 5,249,469 A | 10/1993 | Jonsson et al. |
| 5,257,542 A | 11/1993 | Voss |
| 5,271,277 A | 12/1993 | Pandorf |
| 5,275,055 A | 1/1994 | Zook et al. |
| 5,279,163 A | 1/1994 | D'Antonio et al. |
| 5,291,534 A | 3/1994 | Sakurai et al. |
| 5,311,140 A | 5/1994 | Permuy |
| 5,315,877 A | 5/1994 | Park et al. |
| 5,333,637 A | 8/1994 | Gravel |
| 5,343,755 A | 9/1994 | Huss |
| 5,348,568 A | 9/1994 | Oda et al. |
| 5,349,492 A | 9/1994 | Kimura et al. |
| 5,349,865 A | 9/1994 | Kavli et al. |
| 5,351,548 A | 10/1994 | Briggs et al. |
| 5,351,938 A | 10/1994 | Hegner et al. |
| 5,369,228 A | 11/1994 | Faust |
| 5,400,489 A | 3/1995 | Hegner et al. |
| 5,442,962 A | 8/1995 | Lee |
| 5,443,410 A | 8/1995 | Ko |
| 5,485,345 A * | 1/1996 | Lukasiewicz et al. ..... 361/283.3 |
| 5,497,620 A | 3/1996 | Stobbe |
| 5,499,158 A | 3/1996 | Bishop et al. |
| 5,499,533 A | 3/1996 | Miller et al. |
| 5,507,080 A | 4/1996 | Hayashi et al. |
| 5,525,280 A * | 6/1996 | Shukla et al. ............... 29/25.42 |
| 5,531,128 A | 7/1996 | Ryhanen |
| 5,539,611 A | 7/1996 | Hegner et al. |
| 5,541,561 A | 7/1996 | Grunert et al. |
| 5,542,300 A | 8/1996 | Lee |
| 5,544,399 A * | 8/1996 | Bishop et al. ............. 29/25.41 |
| 5,544,490 A | 8/1996 | Manini et al. |
| 5,561,247 A | 10/1996 | Mutoh et al. |
| 5,571,970 A | 11/1996 | Mutoh et al. |
| 5,603,684 A | 2/1997 | Wetmore et al. |
| 5,604,315 A | 2/1997 | Briefer et al. |
| 5,625,152 A | 4/1997 | Pandorf et al. |
| 5,719,740 A | 2/1998 | Hayashi et al. |
| 5,756,899 A | 5/1998 | Ugai et al. |
| 5,800,235 A | 9/1998 | Ragsdale |
| 5,808,206 A | 9/1998 | Pandorf et al. |
| 5,811,685 A | 9/1998 | Grudzien, Jr. |
| 5,836,063 A | 11/1998 | Hegner et al. |
| 5,885,682 A | 3/1999 | Tanimoto et al. |
| 5,911,162 A | 6/1999 | Denner |
| 5,916,479 A | 6/1999 | Schiabel et al. |
| 5,920,015 A * | 7/1999 | Hallberg et al. ............... 73/724 |
| 5,925,824 A | 7/1999 | Soma et al. |
| 5,932,332 A | 8/1999 | Pandorf et al. |
| 5,939,639 A | 8/1999 | Lethbridge |
| 5,942,692 A | 8/1999 | Haase et al. |
| 5,948,169 A | 9/1999 | Wu |
| 5,965,821 A | 10/1999 | Grudzien |
| 6,019,002 A | 2/2000 | Lee |
| 6,029,524 A | 2/2000 | Klauder et al. |
| 6,029,525 A | 2/2000 | Grudzien |
| 6,105,436 A | 8/2000 | Lischer et al. |
| 6,105,437 A | 8/2000 | Klug et al. |
| 6,112,597 A | 9/2000 | Tschope |
| 6,119,524 A | 9/2000 | Kobold |
| 6,122,976 A * | 9/2000 | Hallberg et al. ............... 73/756 |
| 6,148,674 A | 11/2000 | Park et al. |
| 6,205,861 B1 | 3/2001 | Lee |
| 6,209,398 B1 | 4/2001 | Fowler et al. |
| 6,315,734 B1 | 11/2001 | Nunome |

| | | | |
|---|---|---|---|
| 6,340,929 B1 | 1/2002 | Katou et al. | |
| 6,423,949 B1 | 7/2002 | Chen et al. | |
| 6,439,056 B1 | 8/2002 | Jonsson | |
| 6,443,015 B1 | 9/2002 | Poulin et al. | |
| 6,451,159 B1 | 9/2002 | Lombardi et al. | |
| 6,516,671 B1 | 2/2003 | Romo et al. | |
| 6,528,008 B1 | 3/2003 | Bjoerkman | |
| 6,568,274 B1 | 5/2003 | Lucas et al. | |
| 6,578,427 B1 | 6/2003 | Hegner | |
| 6,581,471 B1 | 6/2003 | Grudzien | |
| 6,588,280 B1 | 7/2003 | Quigley et al. | |
| 6,591,687 B1 | 7/2003 | Bjoerkman et al. | |
| 6,612,176 B1 | 9/2003 | Poulin et al. | |
| 6,735,845 B1 | 5/2004 | Jonsson | |
| 6,772,640 B1 | 8/2004 | Quigley et al. | |
| 6,845,664 B1 * | 1/2005 | Okojie | 73/431 |
| 6,901,808 B1 | 6/2005 | Sharpless et al. | |
| 2003/0110865 A1 | 6/2003 | Johsson | |
| 2003/0118802 A1 | 6/2003 | Bjoerkman | |

FOREIGN PATENT DOCUMENTS

| | | |
|---|---|---|
| DE | 40 11 901 A1 | 10/1991 |
| DE | 41 11 118 A1 | 10/1992 |
| DE | 4 136 995 A1 | 5/1993 |
| DE | 42 07 951-A-1 | 9/1993 |
| EP | 275 844 | 7/1988 |
| EP | 0 473 109 A2 | 3/1992 |
| EP | 0 490 807 A2 | 6/1992 |
| EP | 1369676 | 12/2003 |
| FR | 895938 | 2/1945 |
| FR | 549 229 A2 | 6/1993 |
| GB | 1 497 212 A | 1/1978 |
| GB | 2 044 523 | 10/1980 |
| GB | 2 162 837 | 2/1986 |
| GB | 2 188 155 | 9/1987 |
| JP | 56-162026 A2 | 12/1981 |
| JP | 01204022 A | 8/1989 |
| JP | 5-172675 A2 | 9/1993 |
| SU | 1362971 | 7/1986 |
| WO | WO-99/01731 | 1/1990 |
| WO | WO-95/06236 | 3/1995 |
| WO | WO-95/28623 | 10/1995 |
| WO | WO-95/28624 A1 | 10/1995 |
| WO | WO-98/28624 | 7/1998 |
| WO | WO-98/37392 | 8/1998 |
| WO | WO-98/37393 | 8/1998 |
| WO | WO-98/59228 | 12/1998 |
| WO | WO-99/40405 | 8/1999 |
| WO | WO-99/32866 | 9/1999 |
| WO | WO-00/43745 | 7/2000 |
| WO | WO-01/18516 A1 | 3/2001 |
| WO | WO-01/25740 | 4/2001 |
| WO | WO-02/31458 A2 | 4/2002 |
| WO | WO-02/054034 A1 | 7/2002 |
| WO | WO-03/056289 A1 | 7/2003 |
| WO | WO-03/078952 A2 | 9/2003 |
| WO | WO-03/089891 A1 | 10/2003 |

OTHER PUBLICATIONS

U.S. Appl. No. 2003/167852, filed Sep. 11, 2003, Traverso.
Bal Sal Engineering Company, Inc., Santa Ana, California, BAL SAL Canted Coil Spring Gaskets, pp. 3.2-2 and 3.2-14.
Baratron® Absolute Pressure Transmitters 400 Series, © 1996 MKS Instruments, Inc., Andover, MA.
Baratron® General Purpose Absolute Pressure Transducers, 1993 MKS Instruments, Inc.
Beynon, J.D.E., et al., "A Simple Micromanometer," 1964, J. Sci. Instruments, vol. 41(2), pp. 111-112.
Cook, D.B. et al., "A Simple Diaphragm Micromanometer," 1953, J. Scientific Instruments, vol. 30, pp. 238-239.
Derwent's Abstract No. 88-197466/28, week 8828, Abstract of SU 1362971, Dec. 30, 1987 (Accession No. 7563534).
English Translation from Russian of SU 1362971, Semenov et al., Method for the Evacuation of Absolute-Pressure Sensors and Device for the Carrying Out of the Method, Dec. 1987.
Instrument Specialities, Product Design & Shielding Selection Guide, Fabricated Ultra Flex Gaskets, p. 108.
Patent Abstracts of Japan, Abstract of JP-59-56970, Apr. 2, 1984.
Tecknit, EMI Shield Products, "Custom strips," P. A-3.
Derwent abstract No. 91-199893/27, week 9127, Abstract of SU 1605146 (Pukhov, V.N.) 7 Nov. 7, 1990 (Accession No. 91-1998931).
Derwent abstract No. 91-199892/27, week 9127, Abstract of U 1605145 (Mikhailov, P.G.). Nov. 7, 1990 (Accession No. 8695871).
Suzuki, Y., "Flexible Microgripper and its Application to Micromeasurement of Mechanical and Thermal Properties," Micro Electro Mechanical Systems, 1996; Feb. 11-15, pp. 406-411.

* cited by examiner

METHOD OF FORMING A SEAL BETWEEN A HOUSING AND A DIAPHRAGM OF A CAPACITANCE SENSOR

BACKGROUND OF THE INVENTION

The present invention relates to capacitive pressure transducers. More specifically, the present invention relates to an improved method for forming a seal between a housing and a diaphragm of a capacitive pressure transducer.

FIG. 1A depicts a cross-sectional side view of an assembled prior art capacitive pressure transducer assembly 10. FIG. 1B is an exploded view of the upper housing 40, diaphragm 56 and lower housing 60 of FIG. 1A. Briefly, capacitive pressure transducer assembly 10 includes a body that defines an interior cavity. A relatively thin, flexible diaphragm 56 divides the interior cavity into a first sealed interior chamber 52 and a second sealed interior chamber 54. As will be discussed in greater detail below, diaphragm 56 is mounted so that it flexes, moves, or deforms, in response to pressure differentials in chambers 52 and 54. Transducer assembly 10 provides a parameter that is indicative of the amount of diaphragm flexure and this parameter is therefore indirectly indicative of the differential pressure between chambers 52 and 54. The parameter provided by transducer assembly 10 indicative of the differential pressure is the electrical capacitance between diaphragm 56 and one or more conductors disposed on an upper housing 40.

Capacitive pressure transducer assembly 10 includes a ceramic upper housing 40, a ceramic diaphragm 56 and a ceramic lower housing 60. The upper housing 40, which generally has a circular shape when viewed from the top, defines an upper face 41, a central lower face 47, an annular shoulder 42 that has a lower face 42a and an annular channel 43 that is located between the central lower face 47 and the annular shoulder 42. Lower face 42a of the annular shoulder 42 is substantially co-planar with central lower face 47. The upper housing further includes a pressure tube 44 that defines a central aperture (or passageway) 48 that extends through the housing 40 from the upper side to the lower side. A metallic conductor 46 is disposed on a center portion of the lower face 47.

The diaphragm 56 is generally a circular thin diaphragm that has an upper face 57 and an opposite, lower, face 59. A metallic conductor 58 is disposed on a center portion of upper face 57 of the diaphragm 56. The diaphragm 56 and the upper housing 40 are arranged so that the conductor 46 of the upper housing 40 is disposed opposite to the conductor 58 of the diaphragm 56. Diaphragm 56 is coupled to the upper housing 40 by an air-tight seal (or joint) 70, which is discussed in more detail below. The seal 70 is located between the lower face 42a of the annular shoulder 42 of the upper housing 40 and a corresponding annular portion of face 57 of diaphragm 56. When sealed, the upper housing 40, seal 70 and diaphragm 56 define a reference chamber 52. Aperture 48 of the pressure tube 44 provides an inlet or entry way into reference chamber 52.

The lower housing 60, which generally has a circular shape, defines a central opening 64 and an upwardly projecting annular shoulder 62 that has an upper face 62a. The upper face 62a of shoulder 62 of the lower housing 60 is coupled to a corresponding portion of lower face 59 of diaphragm 56 by an air-tight seal (or joint) 76. Seal 76 can be deposited and fabricated in a manner similar to that of seal 70. When sealed, the lower housing 60, seal 76 and face 59 of the diaphragm 56 define a process chamber 54.

A pressure tube 66 having an inlet passageway 68 is coupled to the lower housing 60 so that the inlet passageway 68 is aligned with the opening 64 of the lower housing 60. Accordingly, the process chamber 54 is in fluid communication, via opening 64 and inlet passageway 68, with an external environment. In operation, the capacitive pressure transducer assembly 10 measures the pressure of this external environment.

Conductors 46 and 58 of the capacitive pressure transducer assembly 10 form parallel plates of a variable capacitor C. As is well known, $C=A\epsilon_r\epsilon_0/d$, where C is the capacitance between two parallel plates, A is the common area between the plates, $\epsilon_0$ is the permittivity of a vacuum, $\epsilon_r$ is the relative permittivity of the material separating the plates (e.g., $\epsilon_r=1$ for vacuum), and d is the axial distance between the plates (i.e., the distance between the plates measured along an axis normal to the plates). So, the capacitance provided by capacitor C is a function of the axial distance between conductor 46 and conductor 58. As the diaphragm 56 moves or flexes up and down, in response to changes in the pressure differential between chambers 52 and 54, the capacitance provided by capacitor C also changes. At any instant in time, the capacitance provided by capacitor C is indicative of the instantaneous differential pressure between chambers 52 and 54. Known electrical circuits (e.g., a "tank" circuit characterized by a resonant frequency that is a function of the capacitance provided by capacitor C) may be used to measure the capacitance provided by capacitor C and to provide an electrical signal representative of the differential pressure. Conductors 46, 58 can be comprised of a wide variety of conductive materials such as gold or copper, for example, and can be fabricated via known thin and thick film processes or other known fabrication methods. When thin film processes are utilized, conductors 46, 48 may have thicknesses of about 1 µm, for example.

Diaphragm 56 is often made from aluminum oxide. Other ceramic materials, such as glass ceramic monocrystalline oxide materials, however, may also be used. Capacitance sensors having ceramic components are disclosed in U.S. Pat. Nos. 5,920,015 and 6,122,976.

In operation, capacitive pressure transducer assembly 10 is normally used as an absolute pressure transducer. In this form, reference chamber 52 is normally first evacuated by applying a vacuum pump (not shown) to pressure tube 44. After reference chamber 52 has been evacuated, tube 44 is then sealed to maintain the vacuum in chamber 52. A "getter" may also be connected to tube 44 so as to maintain the vacuum in reference chamber 52 over long periods of time. This creates a "reference" pressure in chamber 52. Although a vacuum is a convenient reference pressure, other reference pressures can be used. After the reference pressure has been established in chamber 52, the pressure tube 66 is then connected to a source of fluid (not shown) to permit measurement of the pressure of that fluid. Coupling the pressure tube 66 in this fashion delivers the fluid, the pressure of which is to be measured, to process chamber 54 (and to the lower face 59 of the diaphragm 56). The center of diaphragm 56 moves or flexes up or down in response to the differential pressure between chamber 52 and 54 thereby changing the capacitance of capacitor C. Since the instantaneous capacitance of capacitors C is indicative of the position of the diaphragm 56, transducer assembly 10 permits measurement of the pressure in chamber 54 relative to the known pressure in chamber 52.

Transducer assembly 10 can of course also be used as a differential pressure transducer. In this form, pressure tube 44 is connected to a first source of fluid (not shown) and pressure tube 66 is connected to a second source of fluid (not shown). Transducer assembly 10 then permits measurement of the difference between the pressures of the two fluids. Alternatively, reference chamber 52 can be maintained at atmospheric pressure to provide a "gauge" transducer.

As noted above, changes in the differential pressure between chambers 52, 54 cause diaphragm 56 to flex thereby changing the gap between conductor 46 and conductor 58. Measurement of changes in the gap permits measurement of the differential pressure. The gap, however, can also be affected by factors unrelated to pressure. For example, the gap can be affected by changes in temperature. Since the components of transducer assembly 10 can be made from a variety of different materials, each of which has its own characteristic coefficient of thermal expansion, temperature changes in the ambient environment can cause the diaphragm 56 to move closer to, or further away from, conductor 46. Fortunately, changes in the gap caused by temperature changes are characteristically different than changes in the gap caused by changes in differential pressure. To compensate for changes in the gap that are caused due to changes in the ambient temperature, it is known to include a second conductor (not shown) that is disposed adjacent to conductor 46 on the lower face 47 of the upper housing 40. In such an embodiment, conductors 46 and 58 form parallel plates of a variable capacitor C1 and conductor 58 and the second conductor form parallel plates of a variable capacitor C2. The two capacitors, C1 and C2, may be used by known methods to reduce the transducer's sensitivity to temperature changes.

The upper housing 40 is positioned so that the lower face 47, and any conductors disposed thereon, are disposed in a plane that is parallel to the plane defined by the conductor 58 (i.e., diaphragm 56) when the pressures in chambers 52, 54 are equal. As discussed above, the capacitance defined by the conductors 46, 58 depends upon the gap (i.e., axial distance) that exists between these opposing conductors. The gap, which is relatively small (e.g., on the order of 0.0004 inches (10–12 μm)), depends, in part, upon the thickness of the seal 70 and the shape and configuration of the upper housing 40 (e.g., the amount that lower face 42a is out of plane, i.e. offset, with lower face 47, if any).

A method for forming seals 70 and 76 is disclosed in U.S. Pat. No. 6,122,976. In that method, a seal is formed by placing solid glass beads between two surfaces, applying a compression force between the two surfaces and then melting the sealing beads. Upon melting, the melted beads flow into the space between the two surfaces. Upon cooling, the flowed seal bead material forms a seal between the two surfaces.

FIG. 2 shows a bottom view of the upper housing 40 of FIGS. 1A and 1B. In accordance with the teachings of U.S. Pat. No. 6,122,976, glass particles are mixed with a binding agent(s) and a solvent(s) to form a paste material. The paste material is then deposited as a pattern of sealing beads 72 on a surface where the seal is to be formed, e.g., lower face 42a of shoulder 42 of the upper housing 40 and upper face 62a of shoulder 62 of the lower housing 60. The pattern of sealing beads 72 can be deposited and formed on the surface by utilizing suitable screen-printing or pad/brush printing deposition processes. As discussed in more detail below, the sealing beads 72 are deposited so that open channels 78 exist between the sealing beads 72. After the pattern of sealing bead (paste) 72 has been deposited on the surface, the sealing beads 72 are subjected to a drying process, a "burn-off" process and then a prefusion/sintering process. In each subsequent step, the sealing beads 72 are exposed to increasingly higher temperatures. For example, the sealing beads 72 may be heated to 100–150 degrees C. (Celsius) during the drying process, heated to 325–375 degrees C. during the burn-off process and heated to 490–500 degrees C. during the prefusion/sintering process. The deposited sealing beads (paste) 72 are hardened in the drying process so that they can resist handling. During the burn-off process, some of the solvents and binding agents are burned-out of the paste. If the burn-off process is not performed adequately, the seal may not be impermeable and also may be structurally inadequate. When the sealing beads 72 have been sufficiently degassed (burned-off), the temperature is further increased to perform the prefusion/sintering step. During the prefusion/sintering process, the glass particles that are present in a bead 72 fuse together. The beads 72, however, do not flow into the open channels 78 during the prefusion/sintering step. After the prefusion/sintering step, the sealing beads 72 are then allowed to cool. After cooling, the sealing beads 72 can then be mechanically worked, e.g. polished, so that the sealing beads have a desired height. In some applications, the desired height of the (unmelted) sealing beads 72 is established at about 20–24 μm, for example.

The pattern in which the beads 72 are deposited (shown in FIG. 2) affects the ability of the beads 72 to fully degas while the seal 70 (or seal 76) is being formed. To facilitate the degassing of the sealing beads 72, it can be advantageous to deposit the sealing beads 72 with channels 78 between the sealing beads 72. The dimensions of the cross-sections of the sealing beads 72 and the channels 78 that are disposed between them are chosen so that the desired degassing effect can be achieved. In one exemplary embodiment, the sealing beads 72 have a diameter of between 0.1–0.5 mm and the channels 78 have widths of about the same magnitude.

After the sealing beads 72 have been deposited and prepared on the lower face 42a and upper face 62a in the manner described above, the diaphragm 56 is aligned with the upper housing 40 so that the sealing beads 72 located on the lower face 42a come into contact with the sealing area of the upper face 57 of the diaphragm 56 and the lower housing 60 is aligned with the diaphragm 56 so that the sealing beads 72 located on the upper face 62a come into contact with the sealing area of the lower face 59 of the diaphragm 56. A compression force is then applied to the upper housing 40, diaphragm 56 and lower housing 60 in a direction that is generally perpendicular to the orientation of the diaphragm 56. A higher temperature (i.e., higher than that which was applied during the prefusion/sintering step) is then applied to melt the sealing beads 72. Upon melting, the sealing beads 72 flow to fill the voids (i.e., channels 78) that exist between the shoulder 42 of the upper housing 40 and the upper sealing area of the diaphragm 56 and between the shoulder 62 of the lower housing 60 and the lower sealing area of the diaphragm 56. Upon cooling, the sealing beads 72 thus form the air-tight seals 70, 76 which are located between the diaphragm 56 and the upper housing 40 and lower housing 60, respectively. To form a seal 70 (and seal 76) having a desired height (i.e., thickness) and area, the cross-sectional areas and heights of the unmelted sealing beads 72 is set so that the total volume of the sealing bead 72 material is sufficient to form the desired seal 70, i.e., the total volume of the sealing beads 72 is generally equal to the volume of the desired seal 70.

The performance characteristics of a capacitive pressure transducer can be adversely affected if the conductors of the capacitive pressure transducer cannot be accurately located and oriented relative to each other. For example, if the gap between opposing conductors 46, 58 is not established in a controlled manner with tight dimensional tolerances, the capacitive pressure transducer may have unacceptable performance characteristics. Further, if the gap can not be consistently controlled, it may be difficult to produce large numbers of transducers that all have the same performance characteristics.

The sealing method described above does not necessarily insure that the formed seal 70 has an accurate and constant thickness. For example, the seal 70 may be too thick or too thin if an excessive or insufficient amount of sealing bead 72 material is used to form the seal 70. Also, the thickness of the seal 70 may not be constant if the compression force that is applied between the upper housing 40 and the diaphragm 56 during the melting and cooling steps is not uniform.

A need therefore exists for a method of accurately forming a seal between a housing and a diaphragm of a capacitive pressure transducer.

SUMMARY OF THE INVENTION

The present invention is directed to methods and systems for accurately forming a seal between a housing and a diaphragm of a capacitance pressure transducer. In certain capacitance pressure transducers, the axial distance between opposing conductors of the capacitance pressure transducer depends, in part, upon the thickness of the seal that is disposed between the housing and the diaphragm. As described herein, high-temperature and low-temperature sealing beads are utilized to form a seal that has an accurate and constant thickness. By utilizing a seal that has an accurate and constant thickness, the opposing conductors of the capacitance pressure transducer can be accurately positioned and oriented in relationship to each other during the manufacturing process.

In one method, the heights of the high-temperature sealing beads are set at a known height. The low-temperature sealing beads are then deposited between and around the high-temperature sealing beads. The low-temperature sealing beads and high-temperature sealing beads are then exposed to a temperature which is sufficient to melt the low-temperature sealing beads but which is insufficient to melt the high-temperature sealing beads. The melted low-temperature sealing beads flow around the unmelted high-temperature sealing beads. Upon solidifying, the low-temperature sealing beads and high-temperature sealing beads together form the seal. Since the high-temperature sealing beads do not melt during the seal fabrication process, the seal thickness can be set by controlling the height of the unmelted high-temperature sealing beads. In the completed seal, the low-temperature sealing beads, that melted and flowed during formation of the seal, have been converted into a low-temperature material that is conformally disposed around the high-temperature sealing beads. By "conformally disposed," it is meant that the low-temperature material has flowed around the high-temperature sealing beads such that voids in the low-temperature material are generally defined, and filed by, the high-temperature bead material. However, some unfilled voids may exist in the low-temperature material (e.g., at an interface between a high-temperature sealing bead and the low-temperature material). Although it is desirable to avoid formation of such voids, as long as the voids are sufficiently small, and sufficiently small in number, their existence does not compromise the integrity of the seal and also does not imply that the low-temperature material is not conformally disposed around the high-temperature sealing beads.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements. The following drawings are for the purpose of illustration only and are not intended to be limiting of the invention, the scope of which is set forth in the claims that follow.

DETAILED DESCRIPTION

The present invention is directed to methods and systems for accurately forming a seal between a housing and a diaphragm of a capacitance pressure transducer. The present invention provides methods for utilizing high-temperature and low-temperature sealing beads to form a fluid-tight seal that has an accurate, uniform and consistent thickness. By forming a seal that has a controlled thickness, the axial distance between the opposing conductors can be accurately controlled.

Figure 3A:
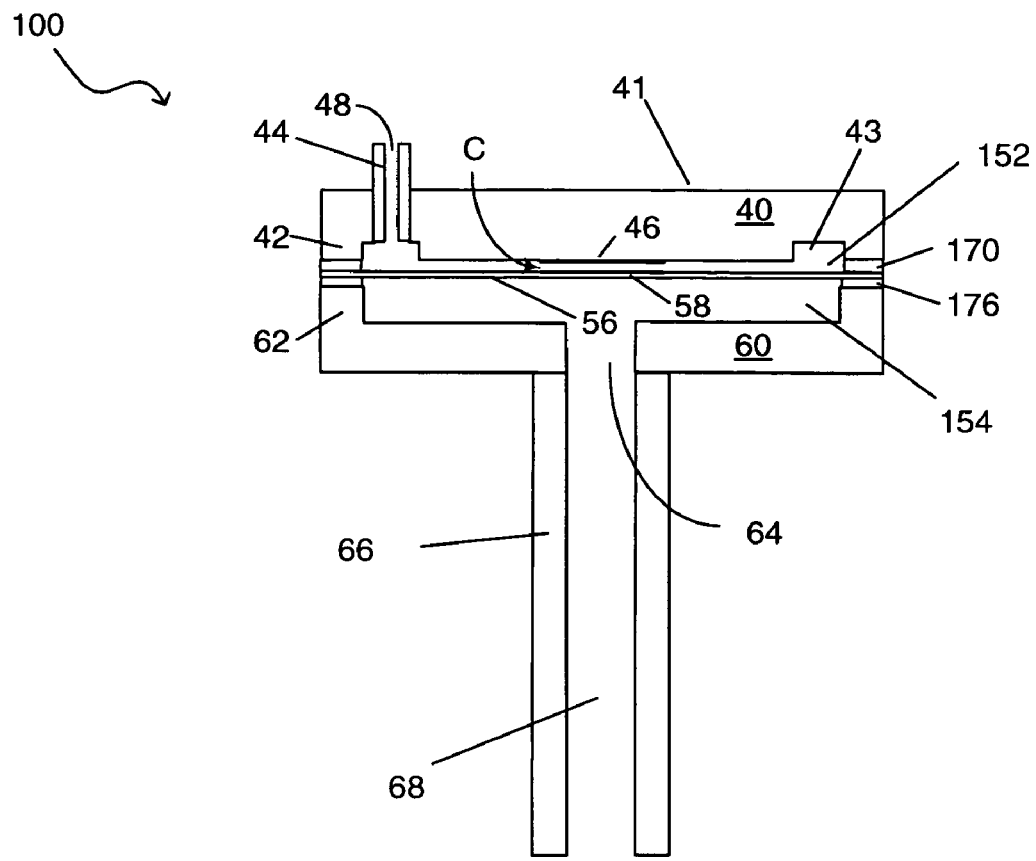
FIG. 3A shows a cross-sectional view of one embodiment of a capacitance sensor constructed in accordance with the invention.
Figure 3B:
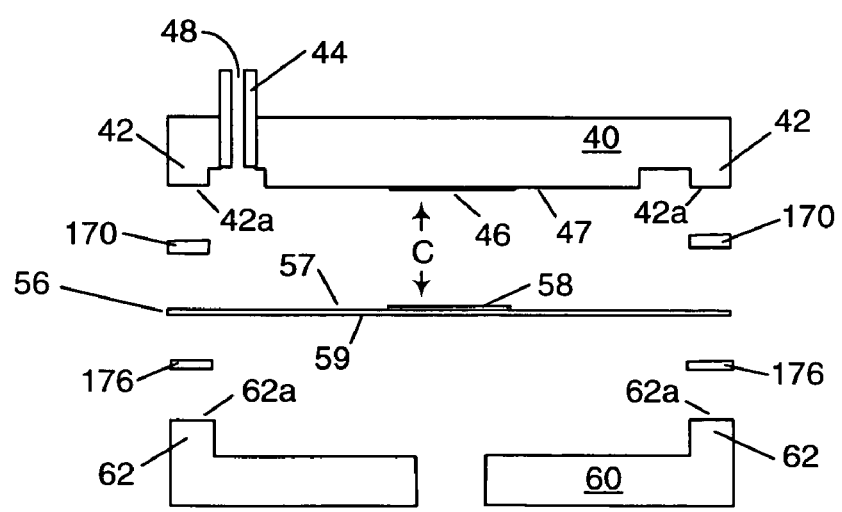
FIG. 3B shows partial, expanded cross-sectional view of the capacitance sensor of FIG. 3A.

FIG. 3A depicts a cross-sectional view of an exemplary capacitance pressure transducer assembly 100 constructed in accordance with the present invention. Like prior art capacitance pressure transducer assembly 10, assembly 100 includes an upper housing 40, a diaphragm 56 and a lower housing 60. FIG. 3B is an exploded cross-sectional view of the upper housing 40, diaphragm 56 and lower housing 60 of the assembly 100 that is depicted in FIG. 3A. Unlike prior art transducer assembly 10, assembly 100 includes an improved seal 170 disposed between the diaphragm 56 and the upper housing 40. When sealed, the upper housing 40, seal 170 and diaphragm 56 define a reference chamber 152.

Similarly, an improved seal 176 may be provided between the diaphragm 56 and the lower housing 60. When sealed, the lower housing 60, seal 176 and diaphragm 56 define a process chamber 154.

Seal 170 is formed by using high-temperature and low-temperature sealing beads. The high-temperature sealing beads have a melting temperature that is higher than that of the low-temperature sealing beads. To provide high-temperature sealing beads that have a higher melting point than that of the low-temperature sealing beads, the high-temperature and low-temperature sealing beads can be comprised of different materials or have different amounts of a common material.

The formed seal 170 has an accurate and constant thickness. By utilizing a seal that has an accurate and constant thickness, the opposing conductors of the capacitance pressure transducer can be accurately positioned and oriented in relationship to each other during the manufacturing process.

Figure 1A:
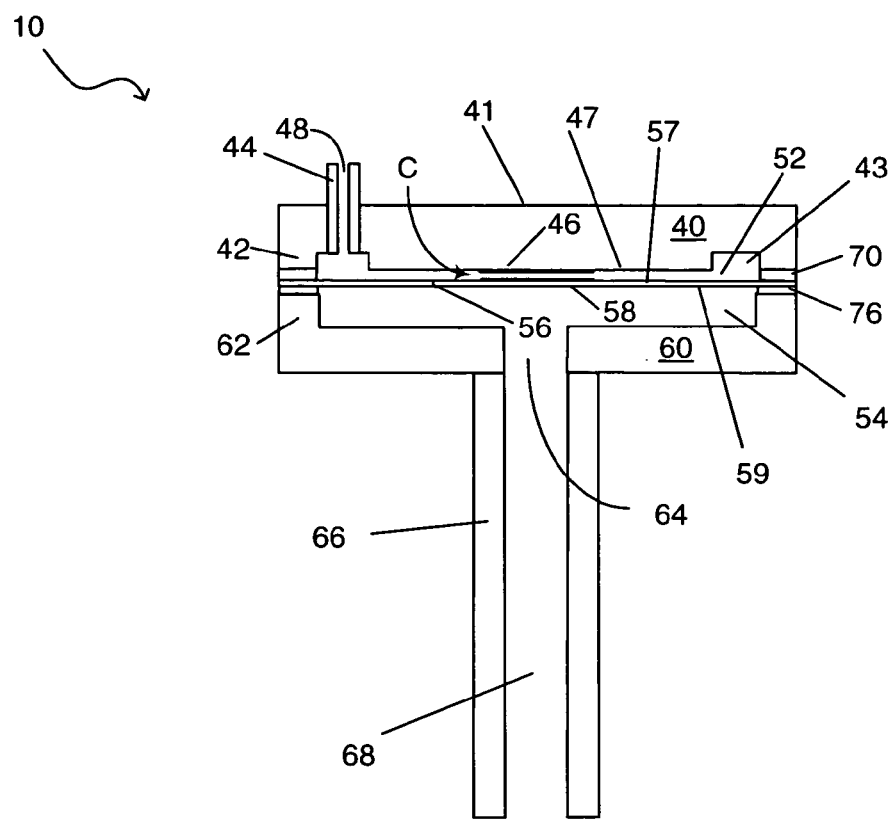
FIG. 1A shows a cross-sectional view of a prior art capacitance sensor.
Figure 1B:
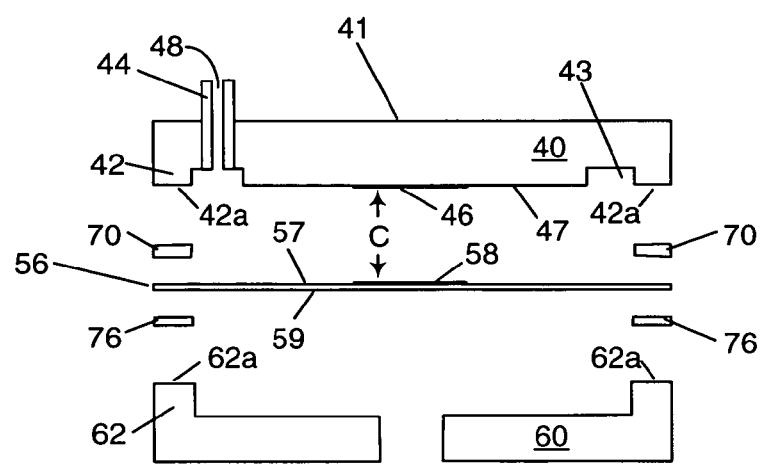
FIG. 1B shows partial, expanded cross-sectional view of the prior art capacitance sensor of FIG. 1A.
Figure 2:
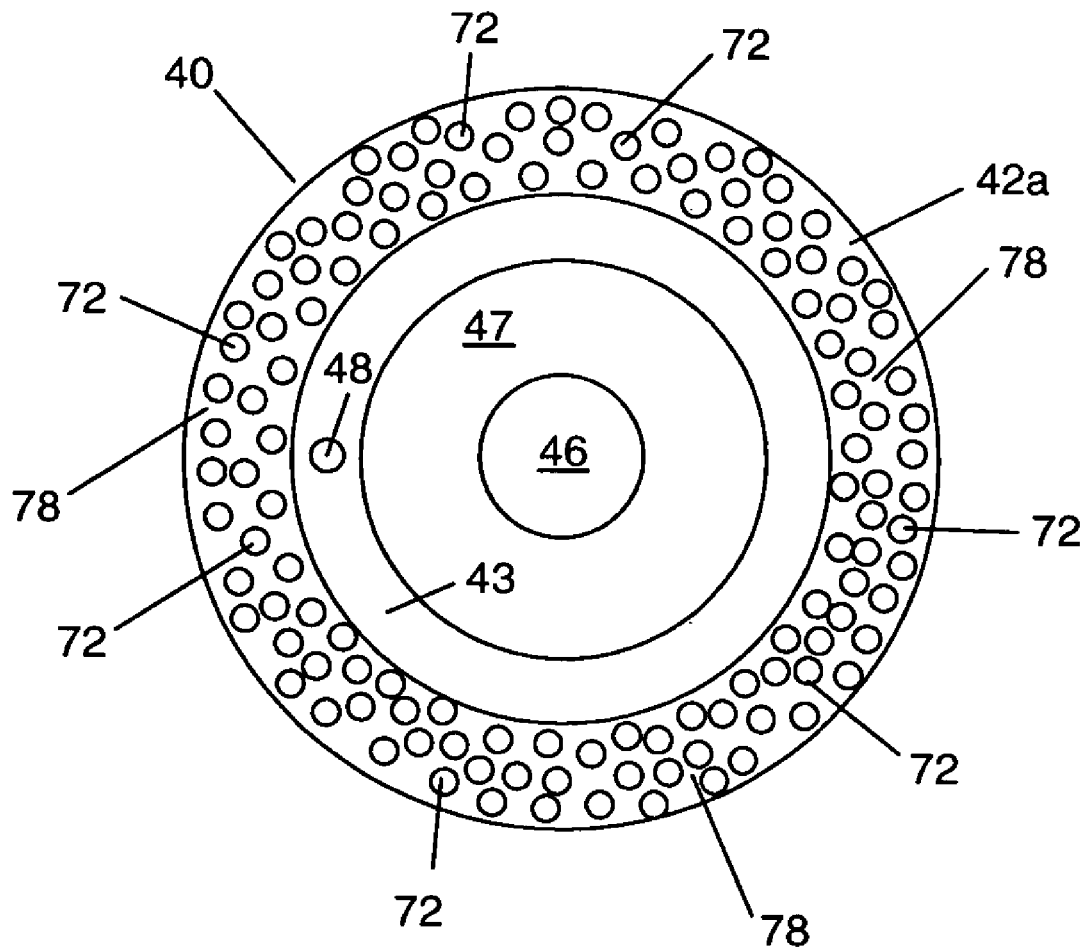
FIG. 2 illustrates how sealing beads can be deposited on a housing of a capacitance sensor to form a seal between the housing and a diaphragm.
Figure 4:
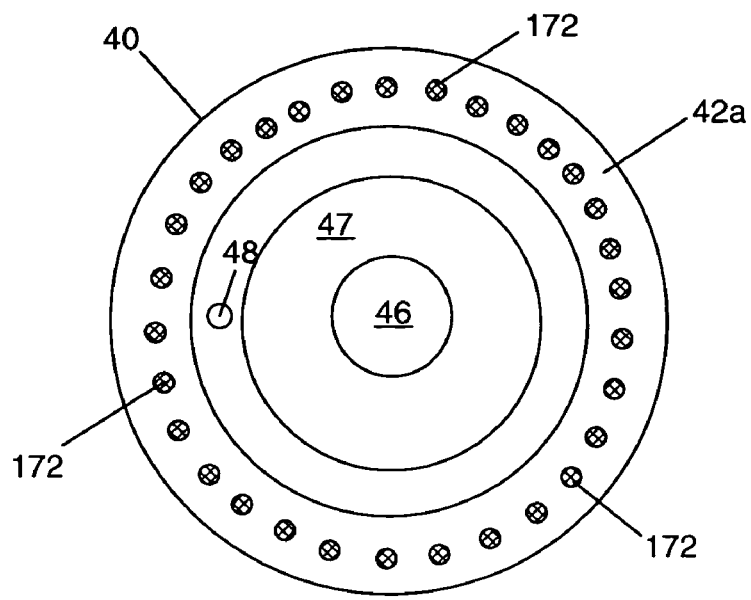
FIG. 4 illustrates an exemplary method of depositing high-temperature sealing beads onto a housing of a capacitance sensor.

FIG. 4 illustrates a plurality high-temperature seal beads 172 deposited on the lower face 42a of the shoulder 42 of the upper housing 40. As shown, the high-temperature sealing beads 172 are uniformly distributed on the lower face 42a of the shoulder 42. The high-temperature seal beads 172 are comprised of a glass material and are deposited and processed in a manner that is similar to the manner in which sealing beads 72 are deposited (as described above in connection with FIG. 2). The high-temperature seal beads 172, for example, are deposited via printing processes that are widely known in the art, the high-temperature seal beads 172 are then dried by applying heat, most of the solvents and binding agents contained within the high-temperature seal beads 172 are then burned-off by subjecting the high-temperature seal beads 172 to a higher temperature, and then the high-temperature seal beads 172 undergo the prefusion/sintering process by exposing the high-temperature seal beads 172 to yet a higher temperature. After the prefusion/sintering step, the high-temperature sealing beads 172 are then allowed to cool so that the high-temperature sealing beads 172 solidify. The high-temperature sealing beads 172 can be formed by depositing the high-temperature paste as beads 172, subjecting the beads 172 to a ramping temperature increase of 40° C./minute until 125° C. is reached, holding at 125° C. for about 15 minutes, further subjecting the beads 172 to a ramping temperature increase of 40° C./minute until 720° C. is reached, holding at 720° C. for about 10 minutes, and then ramping down the temperature at a rate of 40° C./min. The formed high-temperature sealing beads 172 have a melting temperature of about 725° C.

The high-temperature seal beads 172 are not melted (i.e., do not flow in a liquid state) during formation of the seal 170. Rather, the high-temperature sealing beads 172 act as spacers that determine the thickness of seal 170. In other words, by acting as pedestals that extend between the two surfaces that are going to be sealed together, the high-temperature seal beads 172 set the thickness of the seal 170. To provide a seal 170 that has an intended (and constant) thickness, it is important that the high-temperature seal beads 172 have a bead height that is equal to the intended thickness. One simple method of ensuring that seal 170 has the desired thickness is to start with high-temperature sealing beads 172 that are thicker than the desired thickness of the seal 170. After the beads 172 are deposited on shoulder 42, the beads 172 are then polished until their thickness (i.e., height) matches the desired thickness of seal 170. The intended thickness of the seal 170 may be about 10–12 μm, for example.

In additional to lapping/polishing techniques, the height of the high-temperature sealing beads 172 can also be established, for example, by etching, reactive ion etching (dry etching) or laser ablation techniques that are widely known in the art. The height of the high-temperature seal beads 172 can be measured, for example, by drop indicator measurement, laser measurement or target-capacitance measurements techniques that are known in the art.

Figure 5:
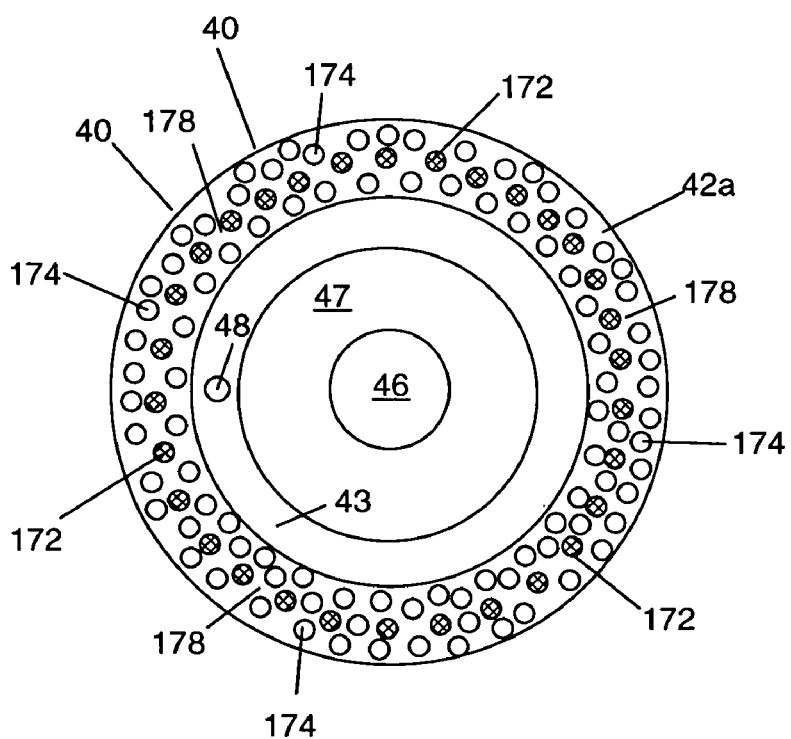
FIG. 5 illustrates an exemplary method of depositing low-temperature sealing beads onto a housing of a capacitance sensor.

Referring now to FIG. 5, once the high-temperature seal beads 172 have been deposited and formed on the lower face 42a of the shoulder 42 and their bead height has been established, low-temperature sealing beads 174 are then deposited amongst and around the high-temperature sealing beads 172 on the lower face 42a. The low-temperature sealing beads 174 have a lower melting point than that of the high-temperature sealing beads 172. It may be advantageous to uniformly distribute the low-temperature sealing beads 174 on the surface to which they are deposited. While the high-temperature seal beads 172 and low-temperature sealing beads 174 of FIGS. 4 and 5 are shown deposited and formed on the lower face 42a of shoulder 42 of the upper housing 40, the high-temperature seal beads 172 and low-temperature sealing beads 174 can instead be deposited and formed on a sealing area of the upper face 57 of the diaphragm 56. The low-temperature seal beads 174 are preferably comprised of a glass material and are deposited and processed in the same manner (with different processing temperatures) as the high-temperature sealing beads 172, as discussed above.

The low-temperature sealing beads 174 are deposited amongst and around the high-temperature sealing beads 172 so as to leave open channels 178 between the low-temperature sealing beads 174 and the high-temperature sealing beads 172. The presence of the open channels 178 will allow the low-temperature sealing beads 174 to adequately degas during the final sealing (melting and cooling) step. After the low-temperature sealing beads 174 have been deposited (e.g., after the drying, burn-off and prefusion/sintering steps described above), the seal 170 is formed by pressing upper housing 40 and diaphragm 56 together and applying sufficient heat to melt the low-temperature sealing beads 174 without also melting the high-temperature sealing beads 172.

When the low-temperature sealing beads 174 are melted, they form a low-temperature material, portions of which flow into and occupy the open channels 178. Thus, the low-temperature sealing beads 174, in conjunction with the unmelted high-temperature sealing beads 172, together form the seal 170. It is important that a proper amount (i.e., volume) of low-temperature sealing bead 174 material is deposited on the shoulder 42 of the upper housing 40—while allowing for the open channels—so that, upon melting, the low-temperature sealing bead 174 material (in conjunction with the volume of high-temperature sealing beads 172) adequately fills the space that seal 170 is to occupy. Therefore, prior to melting the low-temperature sealing beads 174 it may be desirable to insure that the low-temperature sealing beads 174 also have a particular bead height.

Accordingly, after the low-temperature seal beads 174 have cooled (i.e., after the drying, burn-off and prefusion/sintering steps), the bead height of each low-temperature seal bead 174 may be measured and compared to a targeted low-temperature bead height. If the measured bead height of a low-temperature seal bead 174 exceeds the targeted low-temperature bead height, the low-temperature seal bead 174 is then polished down so that the height is equal to the targeted low-temperature bead height. To avoid having low-temperature seal beads 174 that have bead heights that are lower than the targeted low-temperature bead height, it can be advantageous to deposit the low-temperature seal beads 174 on the surface with beads heights that exceed the targeted low-temperature bead height. Since the low-temperature sealing beads 174 will be melted to fill the open channels 178, it follows that the targeted low-temperature bead height is generally greater than the targeted high-temperature bead height. The targeted low-temperature bead height, for example, may be twice the targeted high-temperature bead height.

Figure 6:
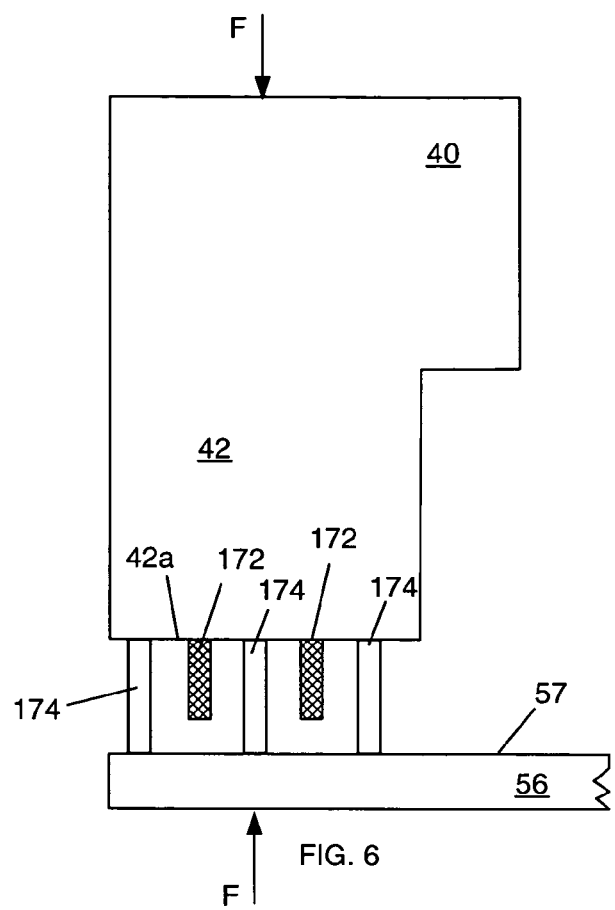
FIG. 6 illustrates one step in an exemplary method of forming a seal between a housing and a diaphragm of a capacitance sensor.
Figure 7:
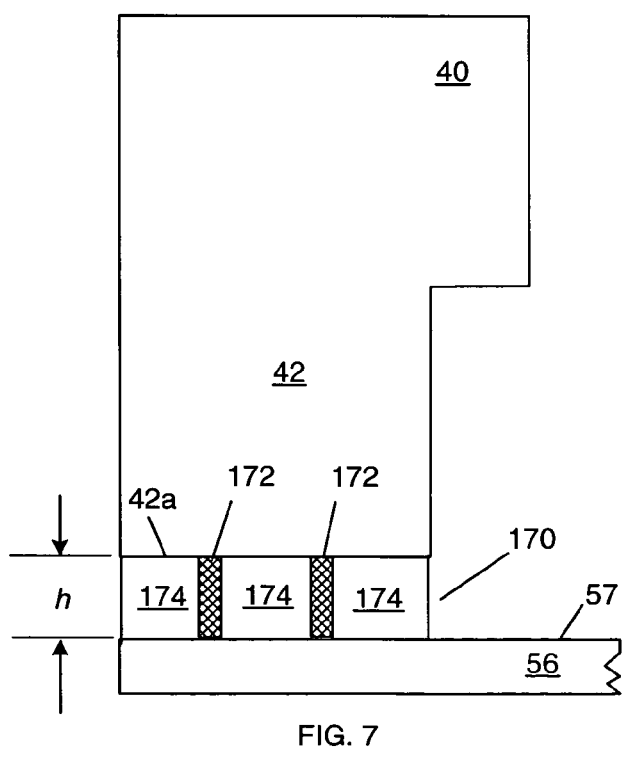
FIG. 7 illustrates another step in an exemplary method of forming a seal between the housing and the diaphragm of a capacitance sensor.

Referring now to FIGS. 6 and 7, once the high-temperature sealing beads 172 and the low-temperature sealing beads 174 have been deposited and formed on the lower face 42a of the upper housing 40, the diaphragm 56 is then aligned with the upper housing 40 so that the low-temperature sealing beads 174 extend from the shoulder 42 of the upper housing 40 to the sealing area of the diaphragm 56. To maintain the upper housing 40 in a proper relationship to the diaphragm, a compression force F is applied between the upper housing 40 and the diaphragm 56 in a direction that is substantially perpendicular to the orientation of the diaphragm 56. The compression force F can be generated by placing a sufficient mass (i.e., weight) on top of the upper housing 40 or, alternatively, by positively exerting a force between the upper housing 40 and the diaphragm 56 through the use of a press, for example. The presence of the compression force F helps insure that the low-temperature sealing beads 174 flow into and fill the open channels 178 when the low-temperature sealing beads 174 melt and that the high-temperature sealing beads 172 come into contact with the upper face 57 of the diaphragm 56.

After the diaphragm 56 is aligned with the upper housing 40 (FIG. 6), the low-temperature sealing beads 174 are exposed to a temperature that is greater than the melting point of the low-temperature sealing beads 174 but less than the melting point of the high-temperature sealing beads 172. Upon melting, the low-temperature sealing beads 174 flow into and fill the open channels 178. Upon cooling, the previously melted low-temperature sealing beads 174 together with the high-temperature sealing beads 172 form the seal 170 (FIG. 7). Since the temperature was maintained below the melting point of the high-temperature sealing beads 172, the bead height h of the unmelted high-temperature sealing beads 172 establishes the thickness of the seal 170. Thus, by setting each of the bead heights h of the unmelted high-temperature sealing beads 172 to a constant height, seal 170 can be formed with an accurate and uniform thickness. Moreover, the thickness of the seal 170 will not be adversely affected if the compression force F is applied unevenly across the sealing area.

Figure 8:
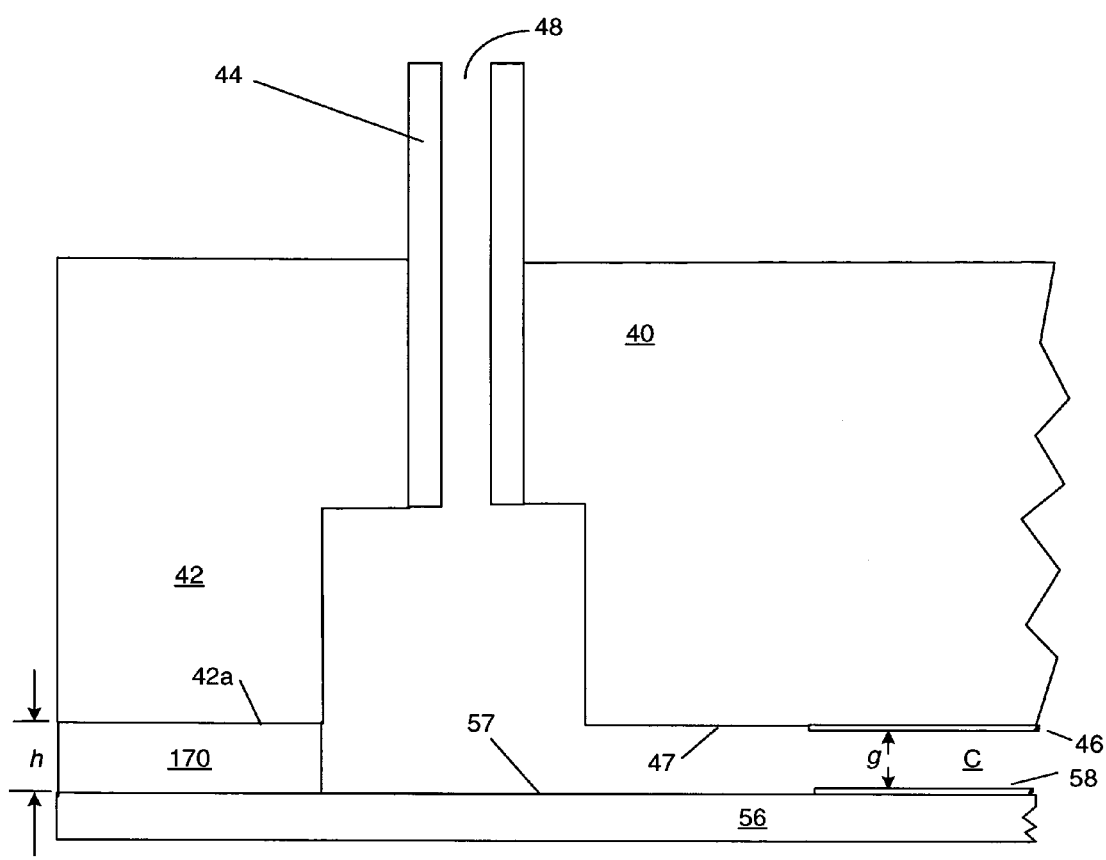
FIG. 8 illustrates a close-up view of an exemplary seal formed between the housing and the diaphragm of a capacitance sensor in accordance with the invention.

FIG. 8 illustrates how the gap g (i.e., axial distance) that exists between conductors 46 and 58 of the capacitance pressure transducer assembly 100 depends, in part, upon the thickness of the seal 170. As previously discussed, lower face 42a and face 47 of the upper housing 40 are substantially co-planar. The upper housing 40 is to be positioned so that face 47 of upper housing 40 is parallel to face 57 of the diaphragm 56 when the pressures in chambers 152, 154 are equal. When the pressures in chambers 152, 154 are equal, the differential pressure acting upon diaphragm 56 is zero and, thus, diaphragm 56 is not subjected to any pressure-induced deflections. As can be seen in FIG. 8, when the pressures in chambers 152, 154 are equal, the gap g that exists between conductors 46, 58 will consist of the thickness of the seal 170 (which is equal to the high-temperature sealing beads 172 bead height h) minus the thicknesses of the conductors 46 and 58.

When a differential pressure is applied to the diaphragm 56, however, a portion of the diaphragm 56 will deflect in response to the differential pressure. The gap g will therefore increase or decrease depending upon the magnitude and direction of the differential pressure. For example, when the pressure in process chamber 154 increases above the pressure in reference chamber 152, a portion of diaphragm 56 will deflect towards face 47 of the upper housing 40 and, therefore, the gap g between conductors 46, 58 will decrease. Alternatively, when the pressure in process chamber 154 is decreases below the pressure in reference chamber 152, a portion of diaphragm 56 will deflect away from face 47 of the upper housing 40 and, therefore, the gap g between conductors 46, 58 will increase.

Figure 9:
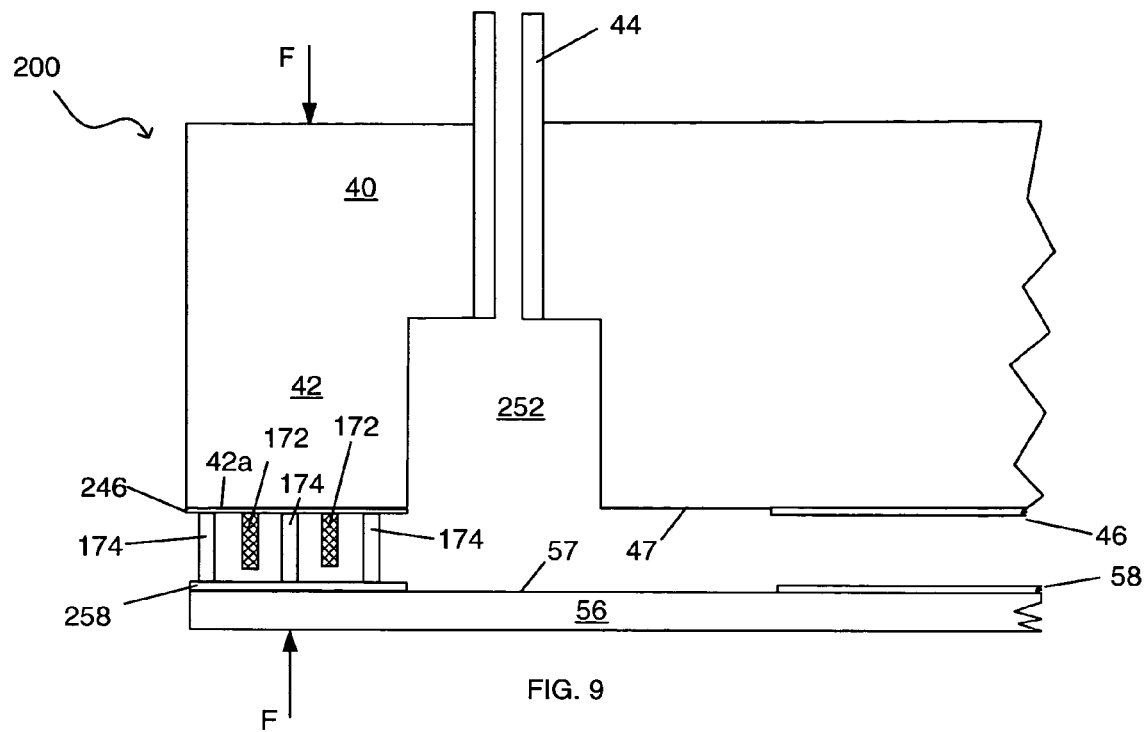
FIG. 9 illustrates one step in an exemplary method of forming a seal between a housing and a diaphragm of a capacitance sensor.
Figure 10:
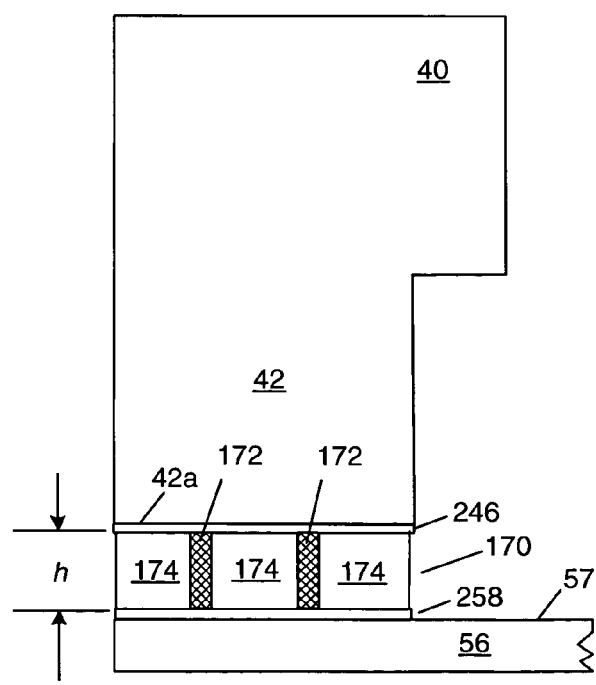
FIG. 10 illustrates another step in an exemplary method of forming a seal between the housing and the diaphragm of a capacitance sensor.
Figure 11:
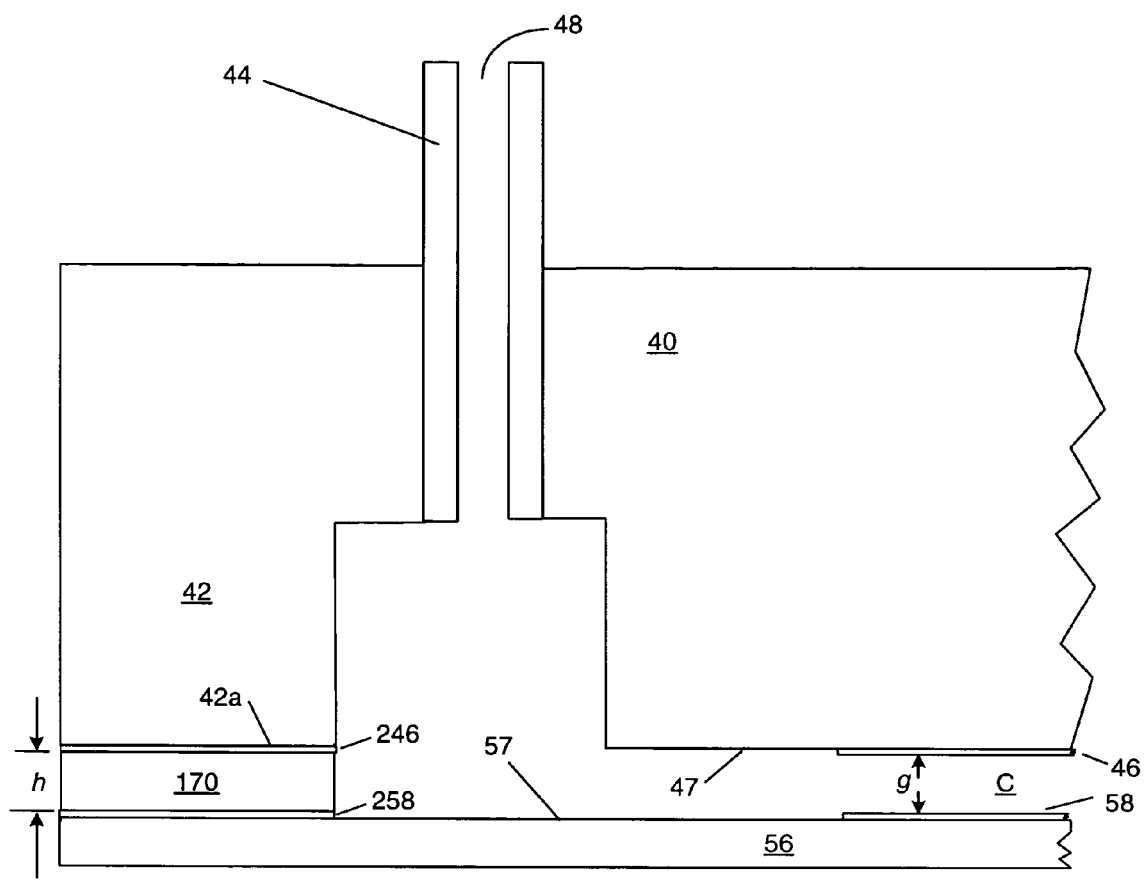
FIG. 11 illustrates a close-up view of an exemplary seal formed between the housing and the diaphragm of a capacitance sensor in accordance with the invention.

Instead of providing a gap g that is dependent upon the thickness of seal 170 and the thicknesses of the conductors 46, 58, it may be advantageous to provide a capacitance pressure transducer assembly that has a gap g that is substantially equal to the thickness of the seal 170. FIGS. 9–11 show partial, cross-sectional views of a capacitance pressure transducer assembly 200 that has a gap g that is substantially equal to the thickness of the seal 170. Assembly 200 is similar to assembly 100 except that a layer 246 has been disposed on the lower face 42a of the shoulder 42 and a layer 258 has been disposed on the upper face 57 of the diaphragm 56. As can be seen in FIG. 9, the layers 246, 258 are disposed on the lower face 42a and upper face 57, respectively, in the areas where the seal 170 is to be formed. When sealed, the upper housing 40, seal 170, layers 246, 258 and diaphragm 56 define a reference chamber 252. Layer 246 has a thickness that is substantially equal to the thickness of the conductor 46 while layer 258 has a thickness that is substantially equal to the thickness of the conductor 58. Layer 246 can be formed on the lower face 42a at the same time that conductor 46 formed on the lower face 47 and can be comprised of the same material as that of the conductor 46. Layer 258 similarly can be formed on the upper face 57 at the same time that conductor 58 is formed on the upper face 57 and also can be comprised of the same material as that of the conductor 58. After the layer 246 has been disposed onto the lower face 42a of the shoulder 42, the high-temperature sealing beads 172 (having a bead height h) and the low-temperature sealing beads 174 can be deposited and formed on the layer 246 in accordance with the techniques previously discussed.

After the diaphragm 56 is aligned with the upper housing 40 (FIG. 9) and a compression force F is applied, the low-temperature sealing beads 174 are then melted. Upon cooling, the low-temperature sealing beads 174 together with the high-temperature sealing beads 172 form the seal 170 which is located between the layers 246, 258 (FIG. 10). As can be seen in FIG. 11, since the thicknesses of the layers 246, 258 are substantially equal to the thicknesses of the conductors 46, 58, respectively, when the pressures in chambers 252, 154 are equal, the gap g that exists between conductors 46, 58 will be substantially equal to the thickness of the seal 170. Since the thickness of the formed seal 170 is set by the bead height h of the high-temperature sealing beads 172, the gap g of the assembly 200 is therefore substantially equal to and controlled by the bead height h.

The layers 246, 258 can be comprised of conducting or non-conducting materials. If conducting materials are utilized, the layers 246, 258 may also serve as capacitance guards for the conductors 46 and 58.

Since the manufacturing tolerances of the fabricated upper housing 40 and diaphragm 56 can be controlled in known manners during the manufacturing of these sensor components, by utilizing the present invention to form a seal between such components, the axial distance between opposing conductors can therefore be established in an accurate, uniform and consistent manner. By providing seals 170 that have accurate, uniform and consistent thicknesses, the present invention can be utilized to provide transducers assemblies that have consistent and reliable performance characteristics.

The upper housing 40 of assemblies 100, 200 has a central lower face 47 that is substantially co-planar with the lower face 42a. In other capacitance pressure transducer assemblies, the central lower face 47 of the upper housing 40 may be offset some distance from the lower face 42a of the shoulder 42. Accordingly, when the pressures in the chambers on both sides of the diaphragm are equal, the gap g that exists between conductors 46, 58 may be dependent upon the thickness of the seal 170 and the amount that the face 47 is offset from the lower face 42a. However, since co-planar surfaces can generally be fabricated with tighter tolerances than surfaces that are not co-planar (e.g., surfaces that are parallel but offset from each other), it can be advantageous to utilize an upper housing 40 that has a central lower face 47 that is substantially co-planar with a lower face 42a.

While the low-temperature sealing beads 174 and high-temperature sealing beads 172 of FIGS. 4 and 5 are shown as having circular cross-sections, the cross-sections of the low-temperature sealing beads 174 and the high-temperature sealing beads 172 may be square, an oblique square, a rhombic or parallel-epipedic shaped (e.g., with the points located adjacent to each other), a hexagon or have a wide variety of other acceptable shapes. The cross-section shapes of the low-temperature sealing beads 174 and the high-temperature sealing beads 172 need not be the same.

The invention has been described above in connection with a ceramic pressure transducer assembly in which upper housing 40, diaphragm 56 and lower housing 60 are all made of ceramic materials (e.g., aluminum oxide). However, other materials can be used without departing from the invention.

Although various embodiments that incorporate the teachings of the present invention have been shown and described in detail herein, those skilled in the art can readily devise many other varied embodiments that incorporate these teachings.

What is claimed is:

1. A method of forming a seal between a housing and a diaphragm of a capacitance pressure transducer, the method comprising:
    depositing a first set of beads onto a sealing area, the sealing area being either a portion of the housing or a portion of the diaphragm, the beads in the first set being characterized a first melting temperature;
    depositing a second set of beads onto the sealing area, the beads in the second set being characterized by a second melting temperature, the second melting temperature being lower than the first melting temperature;
    biasing the housing and the diaphragm towards one another such that at least a portion of the second set of beads contact the housing and the diaphragm;
    heating the diaphragm and housing to a temperature between the first and second melting temperatures and thereby melting at least some of the beads in the second set; and
    cooling the diaphragm and housing to a temperature below the second melting temperature.

2. The method of claim 1, wherein the diaphragm is comprised of a ceramic material.

3. The method of claim 2, wherein the ceramic material is comprised of aluminum oxide.

4. The method of claim 1, wherein the housing is comprised of a ceramic material.

5. The method of claim 1, wherein the beads of the first and second sets are comprised of a glass material.

6. The method of claim 1, wherein the diaphragm and the housing consist of a ceramic material comprising aluminum oxide and wherein the beads of the first and second sets are comprised of a glass material.

7. The method of claim 1, further comprising:
    establishing that each bead of the first set has substantially the same bead height.

8. The method of claim 6, wherein establishing that each bead of the first set has substantially the same bead height comprises:
    measuring a bead height of each bead of the first set;
    comparing the measured bead heights to a targeted bead height; and
    polishing a bead to achieve the targeted bead height if the measured bead height of the bead exceeds the targeted bead height.

9. The method of claim 1, wherein the biasing is caused by placing an additional weight on the capacitance pressure transducer.

10. The method of claim 1, wherein the biasing is caused by an external force that is applied between the housing and the diaphragm.

11. The method of claim 1, further comprising:
    continuing to apply the force and heating the diaphragm and housing until at least a portion of the first set of beads contact the housing and the diaphragm.

12. The method of claim 1, wherein the first and second sets of beads are deposited via a printing process.

13. The method of claim 1, wherein each bead of the first set of beads is comprised of glass particles.

14. The method of claim 13, further comprising:
    drying the deposited first set of beads;
    degassing at least a portion of any organic solvents and binding agents which may be present in the deposited first set of beads;
    fusing together within each bead of the first set of beads at least a portion of the glass particles that are contained within each bead;
    cooling the first set of beads so that the first set of beads solidify;
    measuring the bead height of each bead of the first set of beads;
    comparing the measured bead heights of each bead of the first set of beads to a targeted bead height; and
    polishing a bead of the first set of beads to the targeted bead height if the measured bead height of the bead exceeds the targeted bead height.

15. The method of claim 14, wherein each bead of the second set of beads is comprised of glass particles.

16. The method of claim 15, further comprising:

drying the deposited second set of beads;

degassing at least a portion of any organic solvents and binding agents which may present in the deposited second set of beads;

fusing together within each bead of the second set of beads at least a portion of the glass particles that are contained within each bead;

cooling the second set of beads so that the second set of beads solidify;

measuring the bead height of each bead of the second set of beads;

comparing the measured bead heights of each bead of the second set of beads to a second targeted bead height; and polishing a bead of the second set of beads to the second targeted bead height if the measured bead height of the bead exceeds the second targeted bead height.

17. The method of claim 1, wherein the first and second sets of beads are deposited on the sealing surface so that channels are present between adjacent beads.

* * * * *